US009905172B2

(12) United States Patent
Tsai et al.

(10) Patent No.: US 9,905,172 B2
(45) Date of Patent: *Feb. 27, 2018

(54) LIQUID CRYSTAL DISPLAY DEVICE AND RELATED ALIGNMENT METHOD

(71) Applicant: AU Optronics Corp., Hsin-Chu (TW)

(72) Inventors: Hsuan-Ming Tsai, Hsin-Chu (TW); An-Hsu Lu, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/940,159

(22) Filed: Nov. 13, 2015

(65) Prior Publication Data

US 2016/0071469 A1    Mar. 10, 2016

Related U.S. Application Data

(63) Continuation of application No. 13/787,840, filed on Mar. 7, 2013, now Pat. No. 9,224,346.

(30) Foreign Application Priority Data

Jul. 3, 2012 (TW) .............................. 101123864 A

(51) Int. Cl.
G09G 3/36 (2006.01)
G02F 1/1362 (2006.01)
G02F 1/1337 (2006.01)
G02F 1/137 (2006.01)

(52) U.S. Cl.
CPC ......... *G09G 3/36* (2013.01); *G02F 1/136204* (2013.01); *G02F 1/136286* (2013.01); *G09G 3/3677* (2013.01); *G09G 3/3688* (2013.01); *G02F 1/133711* (2013.01); *G02F 1/133788* (2013.01); *G02F 2001/13775* (2013.01); *G09G 2300/0447* (2013.01); *G09G 2310/0297* (2013.01); *G09G 2330/04* (2013.01)

(58) Field of Classification Search
None
See application file for complete search history.

(56) References Cited

U.S. PATENT DOCUMENTS

2003/0001809 A1    1/2003  Hattori
2003/0043336 A1*   3/2003  Sasaki ............... G02F 1/133788
                                                        349/187
2006/0187170 A1    8/2006  Okuno
(Continued)

FOREIGN PATENT DOCUMENTS

KR    1020060092676 A    8/2006
TW    200636664          10/2006
(Continued)

*Primary Examiner* — Amr Awad
*Assistant Examiner* — Donna Lui
(74) *Attorney, Agent, or Firm* — Locke Lord LLP; Tim Tingkang Xia, Esq.

(57) ABSTRACT

A liquid crystal display device includes a display panel, a multiplexer, an alignment circuit and a short bar circuit. The multiplexer is configured to provide a plurality of output data signals according to a plurality of switch control signals and an input data signal. During the alignment period, the alignment circuit is configured to provide a curing voltage to the display panel, and the short bar circuit is configured to couple the multiplexer to a predetermined voltage.

14 Claims, 6 Drawing Sheets

(56) References Cited

U.S. PATENT DOCUMENTS

2006/0221701 A1 10/2006 Sun
2007/0001962 A1 1/2007 Hasegawa
2012/0133631 A1 5/2012 Lim
2012/0140157 A1 6/2012 Nishiwaki

FOREIGN PATENT DOCUMENTS

TW I297484 6/2008
TW 201003190 1/2010

* cited by examiner

US 9,905,172 B2

LIQUID CRYSTAL DISPLAY DEVICE AND RELATED ALIGNMENT METHOD

CROSS REFERENCE TO RELATED APPLICATIONS

This document is a Continuation of U.S. patent application Ser. No. 13/787,840, filed Mar. 7, 2013 which claims priority to Taiwan Patent Application No. 101123864, filed Jul. 3, 2012, now Taiwan Patent No. I460709.

BACKGROUND OF THE INVENTION

1. Field of the Invention

The present invention is related to a liquid crystal display device and related alignment method, and more particularly, to a liquid crystal display device and related alignment method with ESD protection and reduced mura.

2. Description of the Prior Art

With rapid development of large-size liquid crystal display (LCD) panels, the ability to provide multi-viewing angles have become a major feature. Because of the advantages of multi-viewing angles and low response time, multi-domain vertical alignment (MVA) LCD panels have become the mainstream products of the large-size display panels.

Conventional MVA LCD panels provide multi-viewing angle function by making the liquid crystal molecules in different areas slant in different directions using protrusions (bumps). However, in addition to complicating manufacturing processes, protrusions may also block part of light, thereby lowering the aperture ratio and the brightness performance.

Therefore, polymer stabilized alignment or phase separation alignment (PSA) technology has been developed in which polymers are used to replace the protrusions in MVA LCD panels. The core of PSA technology is to form a polymer-alignment layer over a conventionally coated polyimide by mixing a UV-curable monomer into the liquid crystal molecules. The monomer is then activated by UV radiation while applying a curing voltage. The monomer reacts with the polymer layer to form a surface that fixes the pre-tilt angle of the liquid crystal molecules.

FIG. 1 is a diagram illustrating a prior art LCD device 600. The LCD device 600 includes an LCD panel, a gate driving circuit, a source driving/testing circuit, a multiplexer, and an alignment circuit. The LCD panel is manufactured using PSA technology in which a plurality of data lines, a plurality of gate lines, and a plurality of pixels (not shown) are disposed. The gate driving circuit may provide gate driving signals for turning on each column of pixels. The source driving/testing circuit may provide data signal DIN for charging corresponding rows of pixel. According to the data signal DIN and switch control signals SW1~SWM, the multiplexer may output data signal DOUT1~DOUTM to the LCD panel.

During the alignment period, the multiplexer in the prior art LCD device is floating. Unstable curing voltage or electrostatic discharge (ESD) may influence the alignment process and cause image mura which downgrades display quality.

SUMMARY OF THE INVENTION

An embodiment of the present invention provides an LCD device having a display panel, a multiplexer, an alignment circuit and a short bar circuit. The display panel includes a plurality of pixels; a plurality of data lines disposed along a first direction and respectively coupled to the plurality of pixels; and a plurality of gate lines disposed along a second direction and respectively coupled to the plurality of pixels. The multiplexer is disposed on a first side of the display panel and configured to provide a plurality of output data signals according to a plurality of switch control signals and an input data signal. The multiplexer includes an input end for receiving the input data signal; a plurality of output ends coupled to the plurality of data lines for respectively outputting the plurality of output data signals; and a plurality of switches configured to control transmission paths between the input end and the plurality of output ends according to the plurality of switch control signals. The alignment circuit is configured to provide a curing voltage to the plurality of data lines during an alignment period. The short bar circuit is configured to couple the multiplexer to a predetermined voltage during the alignment period.

An embodiment of the present invention further provides an alignment method for use in an LCD device. The alignment method includes providing the LCD device which includes a display panel having a plurality of pixels and a plurality of data lines; a multiplexer having an input end, a plurality of output ends coupled to the pixels, and a plurality of switches configured to control transmission paths between the input end and the plurality of output ends according to a plurality of switch control signals, respectively; providing a curing voltage to the plurality of data lines and a UV light to the display panel during an alignment period; and coupling the multiplexer to a predetermined voltage for maintaining the plurality of switch control signals at a same level during the alignment period.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
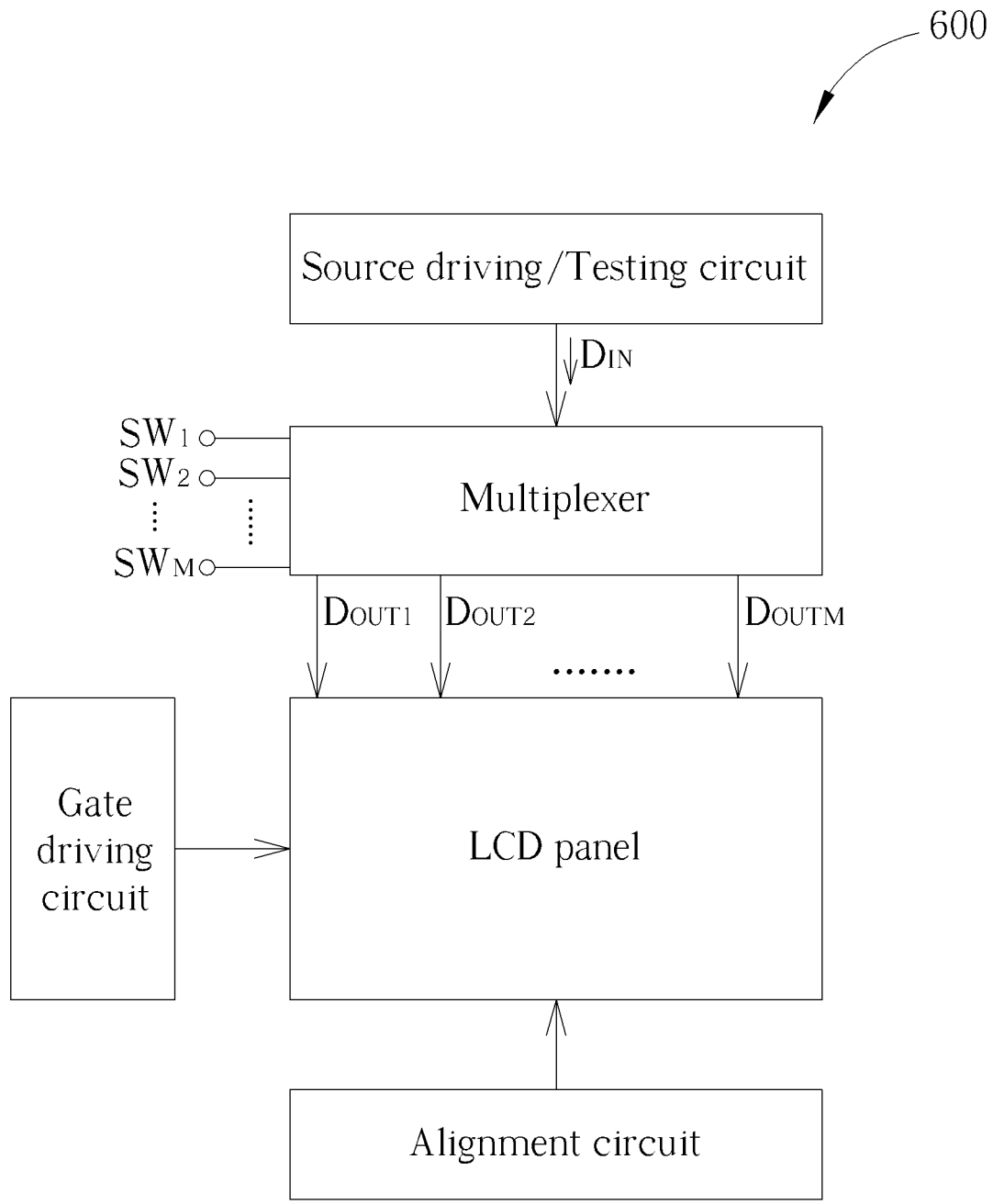
FIG. 1 is a diagram illustrating a prior art LCD device.

FIGS. 2~6 are diagrams illustrating the structure and the operation of LCD devices according to embodiments of the present invention. The LCD device 100 depicted in FIG. 2 includes an LCD panel 10, a gate driving circuit 20, a source driving/testing circuit 30, a multiplexer 40, a first alignment circuit 50, and a short bar circuit 60. The LCD device 200 depicted in FIG. 3 includes an LCD panel 10, a gate driving circuit 20, a source driving/testing circuit 30, a multiplexer 40, a first alignment circuit 50, and a second alignment circuit 55. The LCD device 300 depicted in FIG. 4 and the LCD device 400 depicted in FIG. 5 each include an LCD panel 10, a gate driving circuit 20, a source driving/testing circuit 30, a multiplexer 40, a first alignment circuit 50, a second alignment circuit 55, and a short bar circuit 60. The LCD device 500 depicted in FIG. 6 includes an LCD panel 10, a gate driving circuit 20, a source driving/testing circuit 30, a multiplexer 40, a first alignment circuit 50, a short bar circuit 60, and an ESD protection circuit 70.

In the embodiments of the present invention, the LCD panel 10 may be manufactured using PSA technology in which a plurality of data lines DL1~DLM (M is an integer larger than 1), a plurality of gate lines GL1~GLN (N is an integer larger than 1), and a plurality of pixels PX are disposed on the active area. The gate driving circuit 20 is configured to provide gate driving signals for turning on each row of pixels. The source driving/testing circuit 30 and the multiplexer 40 are configured to provide data signals for charging each column of pixels.

Figure 2:
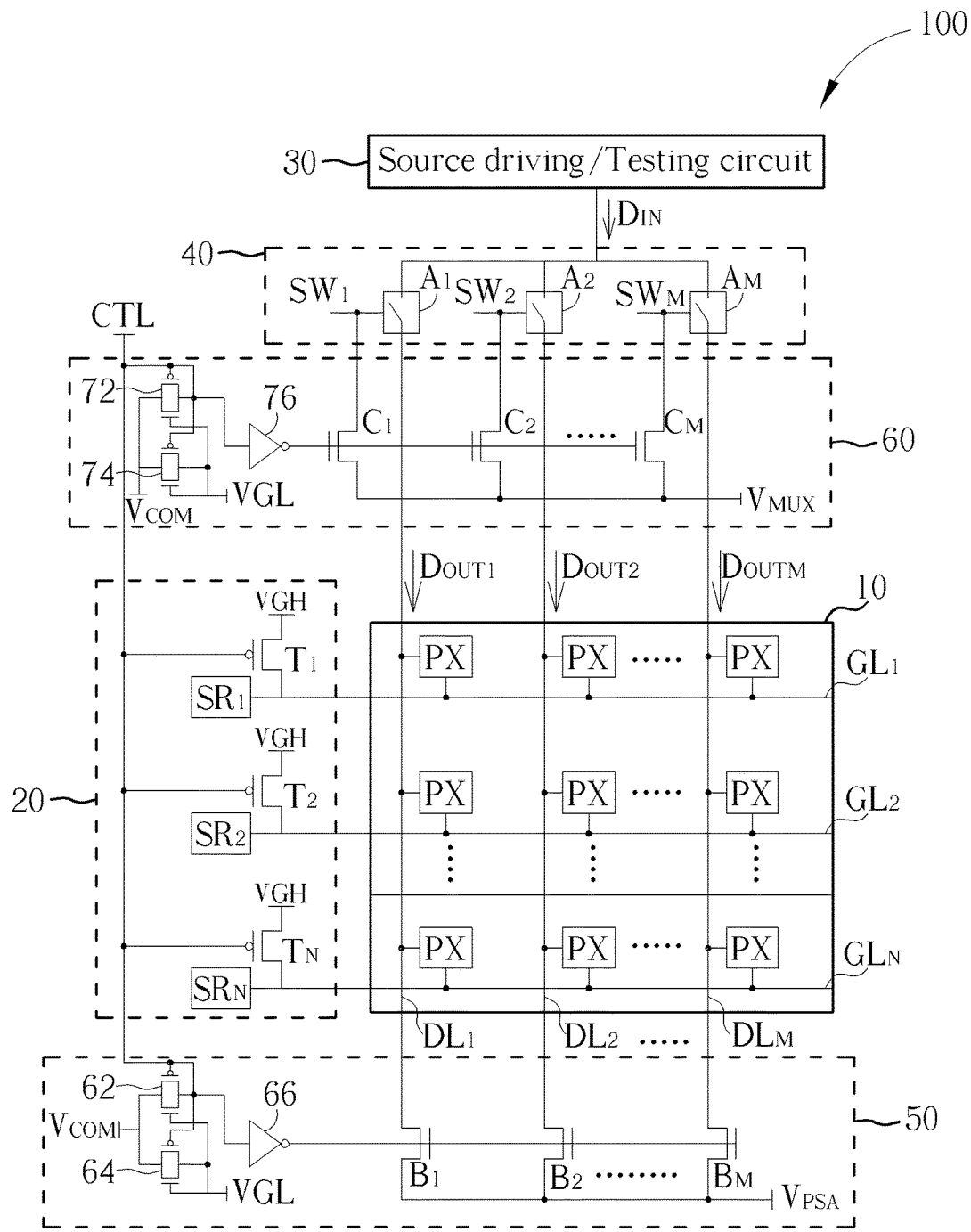
FIGS. 2~6 are diagrams illustrating the structure and the operation of LCD devices according to embodiments of the present invention.

Referring to FIG. 2 for a first embodiment of the present invention, the LCD device 100 performs alignment process using single-sided driving scheme and with ESD protection. During the alignment period, the first alignment circuit 50 is configured to provide a curing voltage VPSA to the data lines DL1~DLM, and the short bar circuit 60 is configured to couple the multiplexer 40 to a predetermined voltage VMUX for turning off the multiplexer 40. The turned-off multiplexer 40 may prevent the ESD generated by the source driving/testing circuit 30 from reaching the data lines DL1~DLM, thereby improving image mura.

Figure 3:
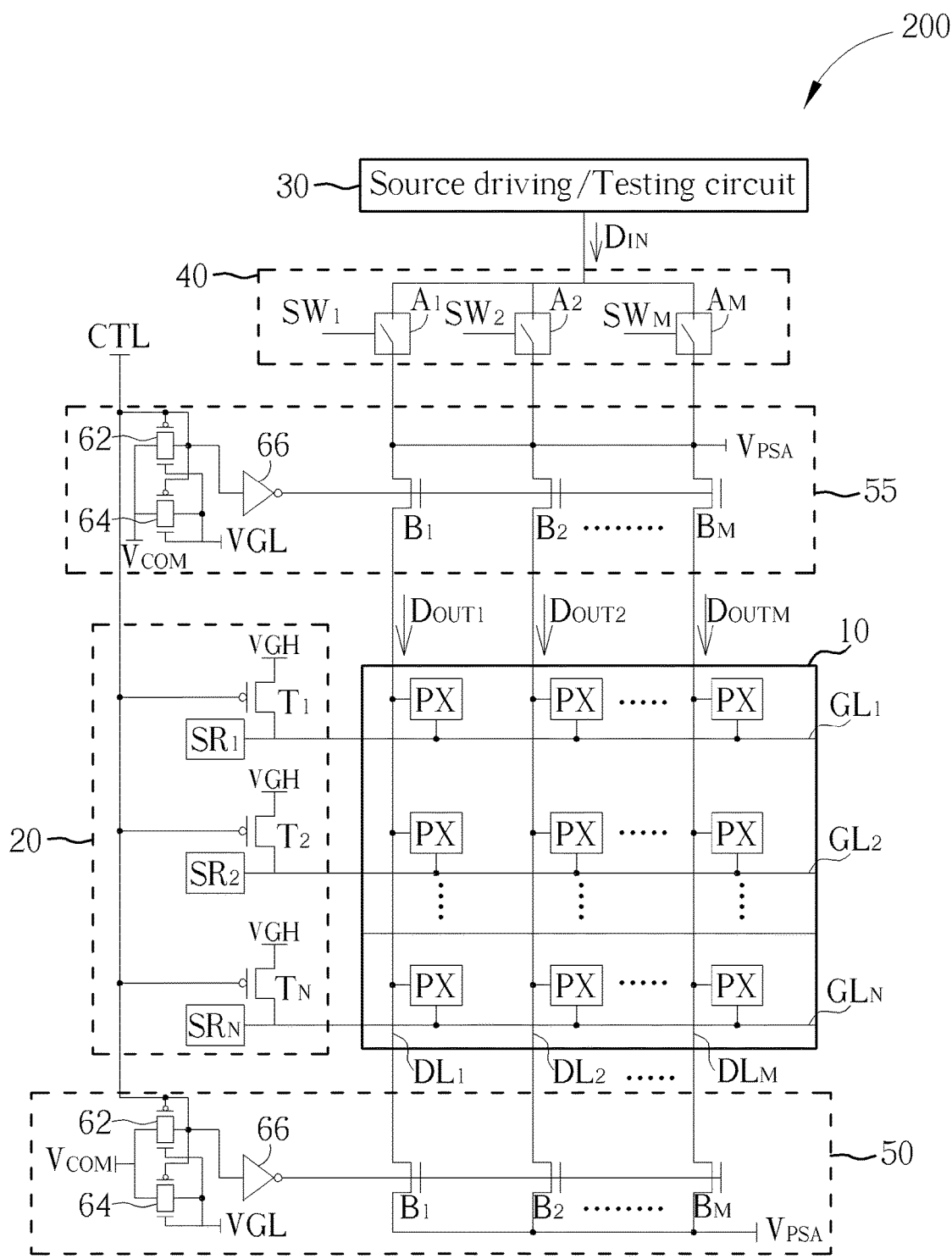

Referring to FIG. 3 for a second embodiment of the present invention, the LCD device 200 performs alignment process using dual-sided driving scheme and with ESD protection. The first alignment circuit 50 and the second alignment circuit 55 are respectively disposed on opposite sides of the LCD panel 10. During the alignment period, the first alignment circuit 50 is configured to provide a curing voltage VPSA to the first side of the data lines DL1~DLM, the second alignment circuit 55 is configured to provide a curing voltage VPSA to the second side of the data lines DL1~DLM, and the multiplexer 40 is floating. The second alignment circuit 55 may share the ESD generated by the source driving/testing circuit 30, thereby improving image mura.

Figure 4:
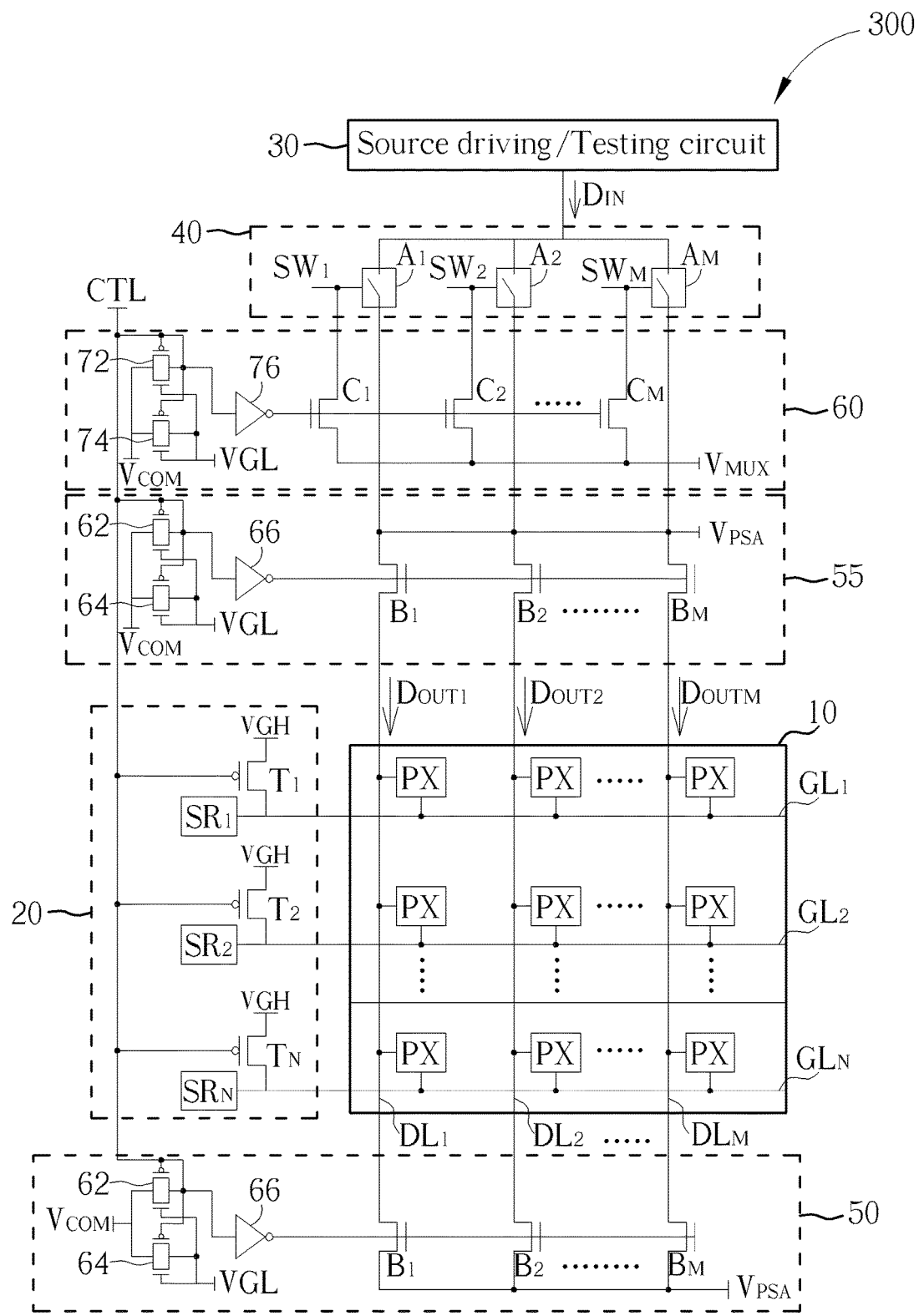

Referring to FIG. 4 for a third embodiment of the present invention, the LCD device 300 performs alignment process using dual-sided driving scheme and with ESD protection. The first alignment circuit 50 and the second alignment circuit 55 are respectively disposed on opposite sides of the LCD panel 10, wherein the first alignment circuit 50 is disposed between the LCD panel 10 and the multiplexer 40. During the alignment period, the first alignment circuit 50 is configured to provide a curing voltage VPSA to the first side of the data lines DL1~DLM, the second alignment circuit 55 is configured to provide a curing voltage VPSA to the second side of the data lines DL1~DLM, and the short bar circuit 60 is configured to couple the multiplexer 40 to a predetermined voltage VMUX for turning off the multiplexer 40. The turned-off multiplexer 40 may prevent the ESD generated by the source driving/testing circuit 30 from reaching the data lines DL1~DLM, thereby improving image mura.

Figure 5:
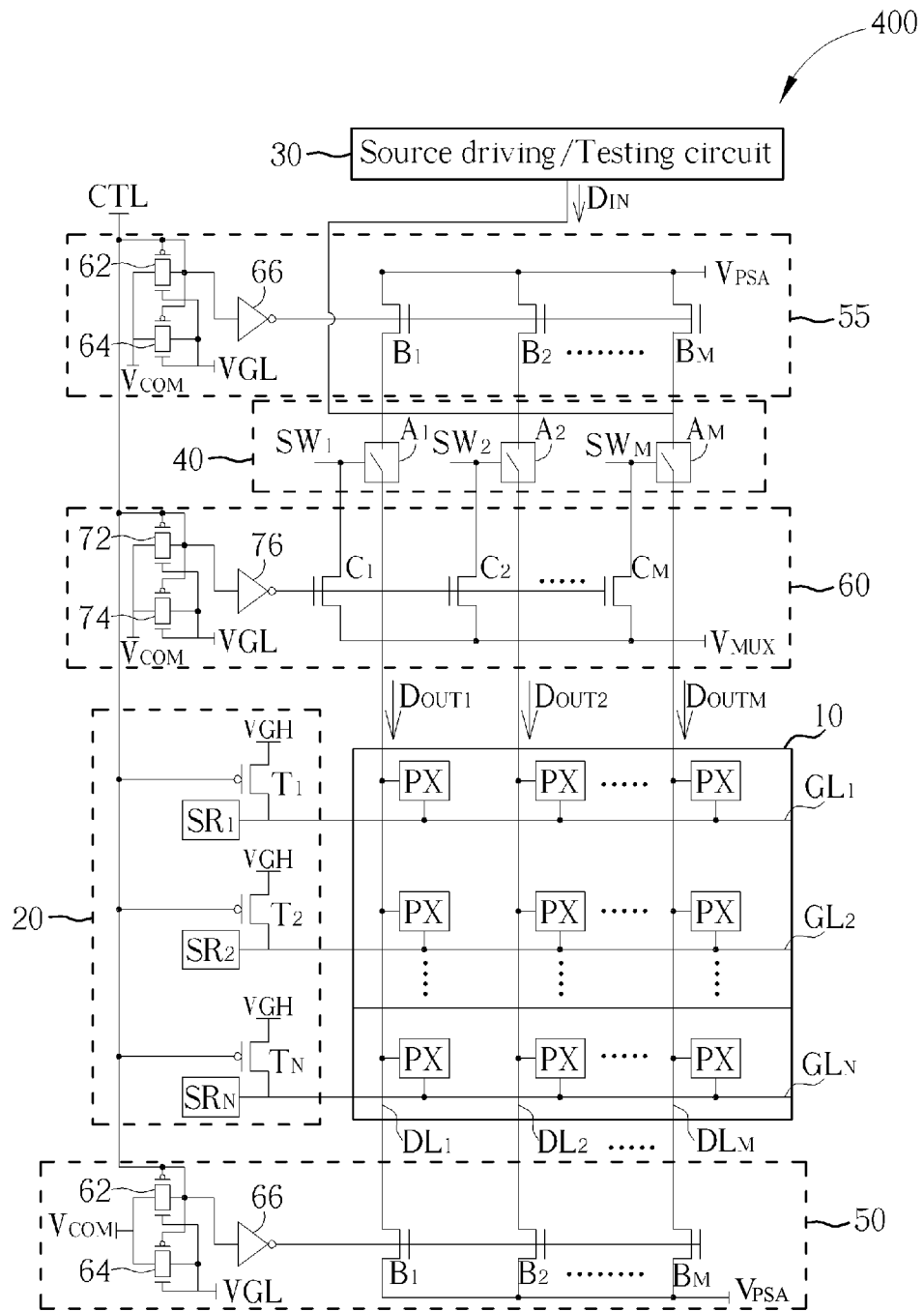

Referring to FIG. 5 for a fourth embodiment of the present invention, the LCD device 400 performs alignment process using dual-sided driving scheme and with ESD protection. The first alignment circuit 50 and the second alignment circuit 55 are respectively disposed on opposite sides of the LCD panel 10, wherein the multiplexer 40 is disposed between the LCD panel 10 and the second alignment circuit 55. During the alignment period, the short bar circuit 60 is configured to couple the multiplexer 40 to a predetermined voltage VMUX for turning on the multiplexer 40, the first alignment circuit 50 is configured to provide a curing voltage VPSA to the first side of the data lines DL1~DLM, and the second alignment circuit 55 is configured to provide a curing voltage VPSA to the second side of the data lines DL1~DLM via the turned-on multiplexer 40. The second alignment circuit 55 may share the ESD present at the input end of the multiplexer 40, thereby improving image mura.

Figure 6:
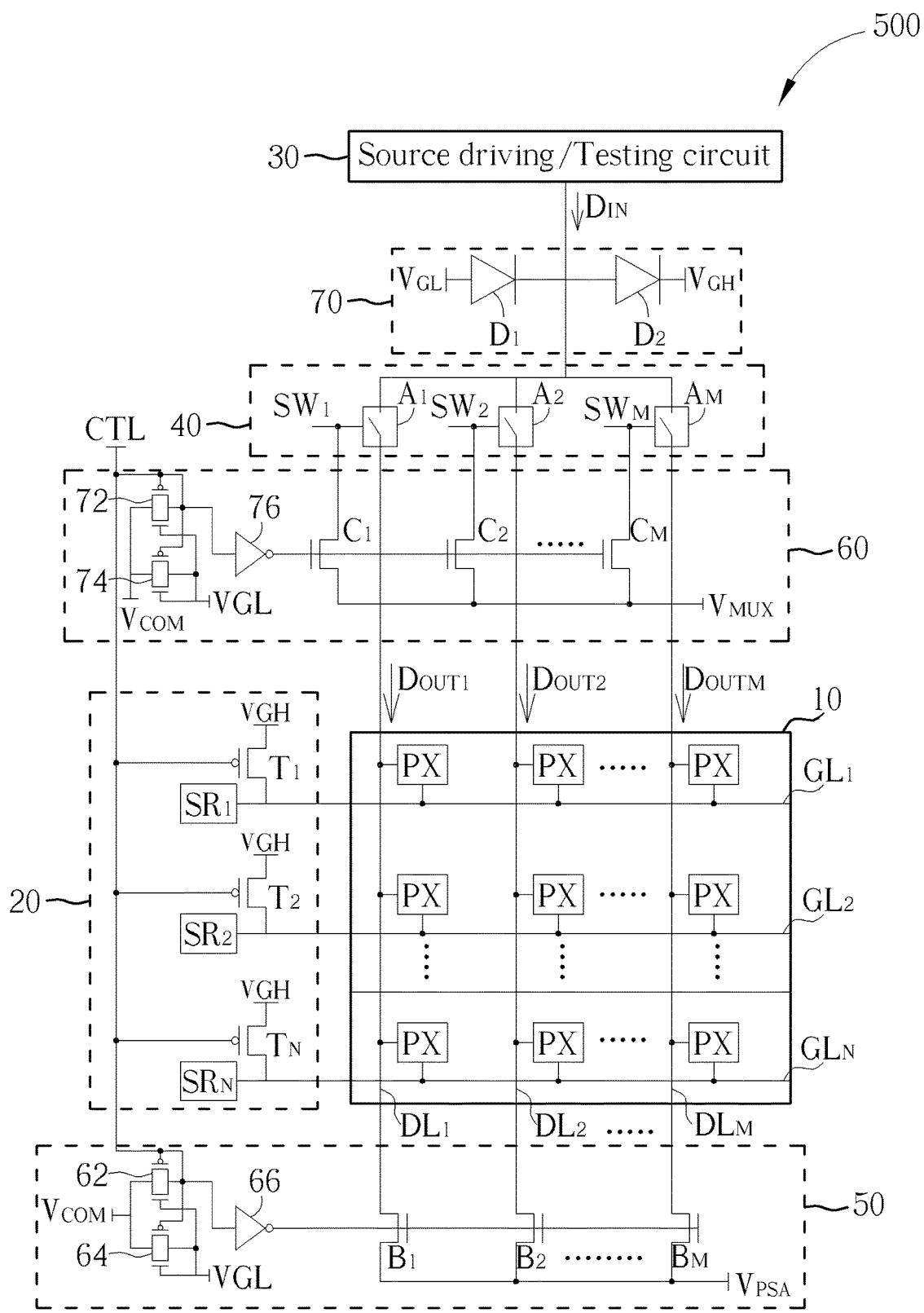

Referring to FIG. 6 for a fifth embodiment of the present invention, the LCD device 500 performs alignment process using single-sided driving scheme and with ESD protection. During the alignment period, the first alignment circuit 50 is configured to provide a curing voltage VPSA to the data lines DL1~DLM, and the short bar circuit 60 is configured to couple the multiplexer 40 to a predetermined voltage VMUX for turning off the multiplexer 40. The ESD protection circuit 70 is disposed between the source driving/testing circuit 30 and the input end of the multiplexer 40. The ESD protection circuit 70 may share the ESD generated by the source driving/testing circuit 30, and the turned-off multiplexer 40 may prevent the ESD generated by the source driving/testing circuit 30 from reaching the data lines DL1~DLM, thereby improving image mura.

In the embodiment illustrated in FIG. 6, the ESD protection circuit 70 may include a first diode and a second diode. The anode of the first diode is coupled to a low level voltage VGL, and the cathode of the first diode is coupled to the input end of the multiplexer 40. The anode of the second diode is coupled to the input end of the multiplexer 40, and the cathode of the second diode is coupled to a high level voltage VGH. However, the embodiment of the ESD protection circuit 70 depicted in FIG. 6 is merely for illustrative purpose and does not limit the scope of the present invention.

In the embodiments of the present invention, the gate driving circuit 20 may include pull-up switches T1~TN and shift registers SR1~SRN. Each pull-up switch includes a first end for receiving a bias voltage VGH, a second end coupled to a corresponding gate line, and a control end for receiving a control signal CTL. During the alignment period, the control signal CTL is set to low level for turning on the pull-up switches T1~TN so that the bias voltage VGH may turn on the pixels PX for receiving the curing voltage VPSA. During the display period, the control signal CTL is set to high level for turning off the pull-up switches T1~TN, thereby preventing the bias voltage VGH from reaching the gate lines GL1~GLN. At the same time, the control signal CTL is inverted to low level by a voltage buffer 66 for turning off the switches B1~BN, thereby preventing the pixels PX from receiving the curing voltage VPSA.

In the embodiments of the present invention, the multiplexer 40 may adopt 1-to-M scheme and may include an input end, M output ends and M switches A1~AM. The input end of the multiplexer 40 is coupled to the source driving/testing circuit 30 for receiving an input signal DIN. The switches A1~AM are configured to control the signal transmission paths between the input end and the output ends of the multiplexer 40 according to the control signals SW1~SWM, respectively. Therefore, the multiplexer 40 may output data signals DOUT1~DOUTM to the data lines DL1~DLM, respectively.

In the embodiments of the present invention, the alignment circuits 50 and 55 may each include M switches B1~BN, transmission logic gates 62 and 64, and a voltage buffer 66. The switches B1~BN include first ends respectively coupled to the data lines DL1~DLM, second ends for receiving a curing voltage VPSA, and control ends coupled to the output end of the voltage buffer 66. Each of the transmission logic gates 62 and 64 includes a first end coupled to the control ends of the pull-up switches T1~TN, a second control end for receiving a bias voltage VGL, and an input end for receiving a bias voltage VCOM. The output end of the transmission logic gate 62 is coupled to the input end of the voltage buffer 66, and the output end of the transmission logic gate 64 is coupled to receive the bias voltage VGL. The bias voltage VGH may be a high level voltage, the bias voltage VGL may be a low level voltage, and the bias voltage VCOM may be a common voltage.

In the embodiments of the present invention, the short bar circuit 60 may include M switches C1~CM, transmission logic gates 72 and 74, and a voltage buffer 76. The switches C1~CM include first ends respectively coupled to the control ends of the switches A1~AM, second ends for receiving a predetermined voltage VMUX, and control ends coupled to the output end of the voltage buffer 76. Each of the transmission logic gates 72 and 74 includes a first end coupled to the control ends of the pull-up switches T1~TN, a second control end for receiving a bias voltage VGL, and an input end for receiving a bias voltage VCOM. The output end of the transmission logic gate 72 is coupled to the input end of the voltage buffer 76, and the output end of the transmission logic gate 74 is coupled to receive the bias voltage VGL. The bias voltage VGH may be a high level voltage, the bias voltage VGL may be a low level voltage, and the bias voltage VCOM may be a common voltage.

During the alignment period, the control signal CTL is set to turn on the switches B1~BM so that the data lines DL1~DLM may be coupled to the curing voltage VPSA. Meanwhile, the control signal CTL is set to turn on the switches C1~CM so that the control ends of the switches A1~AM may be coupled to the predetermined voltage VMUX.

In the LCD devices 100, 200, 300 and 500 according to embodiments of the present invention, the predetermined voltage VMUX may be set to the turn-off voltage of the switches A1~AM or smaller than the turn-on voltage of the switches A1~AM so as to turn off the multiplexer 40 during the alignment period. The turned-off multiplexer 40 may prevent the ESD generated by the source driving/testing circuit 30 from reaching the data lines DL1~DLM, thereby improving image mura.

In the LCD device 400 according to embodiments of the present invention, the predetermined voltage VMUX may be set to the turn-on voltage of the switches A1~AM or larger than the turn-on voltage of the switches A1~AM so as to turn on the multiplexer 40 during the alignment period. The second alignment circuit 55 may share the ESD present at the input end of the multiplexer 40, thereby improving image mura.

During the alignment period, the multiplexer in the LCD device of the present invention is coupled to a predetermined voltage in order to prevent unstable curing voltage or ESD from influencing the curing process. The display quality can thus be improved by reducing image mura.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A liquid crystal display device, comprising:
   a display panel, comprising:
      a plurality of pixels;
      a plurality of data lines disposed along a first direction and respectively coupled to the plurality of pixels; and
      a plurality of gate lines disposed along a second direction and respectively coupled to the plurality of pixels;
   a multiplexer disposed on a first side of the display panel and configured to provide a plurality of output data signals according to a plurality of first switch control signals and an input data signal, the multiplexer comprising:
      an input end for receiving the input data signal;
      a plurality of output ends coupled to the plurality of data lines for respectively outputting the plurality of output data signals; and
      a plurality of first switches configured to control transmission paths between the input end and the plurality of output ends according to the plurality of first switch control signals;
   a first alignment circuit configured to provide a curing voltage to the plurality of data lines during an alignment period;
   a first short bar circuit configured to couple the multiplexer to a predetermined voltage during the alignment period and to provide the predetermined voltage for turning off the multiplexer during the alignment period, wherein in the alignment period, liquid crystal molecules of the liquid crystal display device undergo alignment so as to be substantially parallel to each other; and
   a second alignment circuit coupled to the plurality of data lines and configured to provide the curing voltage to the plurality of data lines during the alignment period, wherein the first alignment circuit and the second alignment circuit are disposed on opposite sides of the display panel.

2. The liquid crystal display device of claim 1, wherein:
   the multiplexer is disposed between the display panel and the second alignment circuit;
   the curing voltage is transmitted to the plurality of data lines via the multiplexer; and
   the first short bar circuit is further configured to provide the predetermined voltage for turning on the multiplexer during the alignment period.

3. The liquid crystal display device of claim 1, further comprising: an electrostatic discharge circuit coupled to the input end of the multiplexer and comprising:
   a first diode including an anode coupled to a low level voltage and a cathode coupled to the input end of the multiplexer; and
   a second diode including an anode coupled to the input end of the multiplexer and a cathode coupled to a high level voltage.

4. The liquid crystal display device of claim 1, wherein each gate line is coupled to a pull-up switch which includes:
   a control end for receiving a second switch control signal;
   a first end for receiving a high level voltage; and
   a second end coupled to the gate line.

5. The liquid crystal display device of claim 4, wherein the first alignment circuit comprises:
   a plurality of second switches each including:
      a control end;
      a first end for receiving the curing voltage; and
      a second end coupled to a corresponding data line;
   a first transmission logic gate, comprising:
      an input end for receiving a common voltage;
      a first control end coupled to the control ends of the pull-up switches;
      an output end coupled to the first control end of the first transmission logic gate; and
      a second control end for receiving a low level voltage;
   a second transmission logic gate, comprising:
      an input end for receiving the common voltage;
      a first control end coupled to the control ends of the pull-up switches; an output end coupled to the second control end of the first transmission logic gate; and a second control end coupled to the second control end of the first transmission logic gate; and
a voltage buffer, comprising:
an input end coupled to the output end of the first transmission logic gate; and
an output end coupled to the control end of the second switches.

6. The liquid crystal display device of claim 1, wherein each gate line is coupled to a pull-up switch and the first alignment circuit comprises:
a plurality of second switches each including:
a control end;
a first end for receiving the curing voltage; and
a second end coupled to a corresponding data line;
a first transmission logic gate, comprising:
an input end for receiving a common voltage;
a first control end coupled to the control ends of the pull-up switches;
an output end coupled to the first control end of the first transmission logic gate; and
a second control end for receiving a low level voltage;
a second transmission logic gate, comprising:
an input end for receiving the common voltage;
a first control end coupled to the control ends of the pull-up switches;
an output end coupled to the second control end of the first transmission logic gate; and
a second control end coupled to the second control end of the first transmission logic gate; and
a voltage buffer, comprising:
an input end coupled to the output end of the first transmission logic gate; and
an output end coupled to the control end of the second switches.

7. An alignment method for use in a liquid crystal display device, the liquid crystal display device comprising:
a display panel having a plurality of pixels and a plurality of data lines; and
a multiplexer having an input end, a plurality of output ends coupled to the pixels, and a plurality of switches configured to control transmission paths between the input end and the plurality of output ends according to a plurality of switch control signals, respectively;
the method comprising:
providing a curing voltage to the plurality of data lines and a UV light to the display panel during an alignment period;
coupling the multiplexer to a predetermined voltage for maintaining the plurality of switch control signals at a same level and for turning off the multiplexer using the predetermined voltage during the alignment period, wherein in the alignment period, liquid crystal molecules of the liquid crystal display device undergo alignment so as to be substantially parallel to each other; and
transmitting the curing voltage to a first side of the plurality of data lines during the alignment period, and transmitting the curing voltage to a second side of the plurality of data lines via the multiplexer during the alignment period.

8. The alignment method of claim 7, further comprising coupling the multiplexer to the predetermined voltage for maintaining the plurality of switch control signals at the same level and for turning on the switches of the multiplexer using the predetermined voltage during the alignment period.

9. The alignment method of claim 8, further comprising transmitting the curing voltage to the plurality of data lines via the switches of the multiplexer during the alignment period.

10. A liquid crystal display device, comprising:
a display panel comprising a plurality of pixels formed of liquid crystal molecules mixed with a UV-curable monomer, a plurality of data lines respectively coupled to the plurality of pixels, and a plurality of gate lines respectively coupled to the plurality of pixels, each gate line respectively coupled to a pull-up switch of a plurality of pull-up switches;
a multiplexer comprising a plurality of first switches configured to control transmission paths between an input end and a plurality of output ends respectively coupled to the plurality of data lines;
a first alignment circuit configured to provide a curing voltage to the plurality of data lines during an alignment period, the first alignment circuit comprising:
a plurality of second switches each including:
a control end;
a first end for receiving the curing voltage; and
a second end coupled to a corresponding data line;
a first transmission logic gate, comprising:
an input end for receiving a common voltage;
a first control end coupled to control ends of the pull-up switches;
an output end coupled to the first control end of the first transmission logic gate; and
a second control end for receiving a low level voltage;
a second transmission logic gate, comprising:
an input end for receiving the common voltage;
a first control end coupled to the control ends of the pull-up switches;
an output end coupled to the second control end of the first transmission logic gate; and
a second control end coupled to the second control end of the first transmission logic gate; and
a voltage buffer, comprising:
an input end coupled to the output end of the first transmission logic gate; and
an output end coupled to the control end of the second switches; and
a second alignment circuit coupled to the plurality of data lines and configured to provide the curing voltage to the plurality of data lines during the alignment period, wherein the first alignment circuit and the second alignment circuit are disposed on opposite sides of the display panel.

11. The liquid crystal display device of claim 10, further comprising:
an electrostatic discharge circuit coupled to the input end of the multiplexer and comprising:
a first diode including an anode coupled to a low level voltage and a cathode coupled to the input end of the multiplexer; and
a second diode including an anode coupled to the input end of the multiplexer and a cathode coupled to a high level voltage.

12. The liquid crystal display device of claim 10, further comprising a short bar circuit configured to couple the multiplexer to a predetermined voltage during the alignment period to turn off the multiplexer during the alignment period, wherein the alignment period is defined as a period when the UV-curable monomer is activated by a UV radiation while the first alignment circuit is providing the curing voltage to the plurality of data lines.

13. The liquid crystal display device of claim 10, further comprising a short bar circuit configured to couple the multiplexer to a predetermined voltage during the alignment period; wherein:
   the curing voltage is transmitted to the plurality of data lines via the multiplexer; and
   the short bar circuit is further configured to provide the predetermined voltage for turning on the multiplexer during the alignment period.

14. The liquid crystal display device of claim 10, wherein each pull-up switch includes:
   a control end for receiving a switch control signal;
   a first end for receiving a high level voltage; and
   a second end coupled to the gate line.

* * * * *